(12) United States Patent
Hoshizawa

(10) Patent No.: US 8,976,639 B2
(45) Date of Patent: Mar. 10, 2015

(54) DISK-SHAPED RECORDING MEDIUM AND RECORDING/REPRODUCING DEVICE FOR DISK-SHAPED RECORDING MEDIUM

(75) Inventor: Taku Hoshizawa, Tokyo (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 14/119,415

(22) PCT Filed: Jun. 10, 2011

(86) PCT No.: PCT/JP2011/003283
§ 371 (c)(1),
(2), (4) Date: Nov. 21, 2013

(87) PCT Pub. No.: WO2012/168979
PCT Pub. Date: Dec. 13, 2012

(65) Prior Publication Data
US 2014/0098654 A1    Apr. 10, 2014

(51) Int. Cl.
*G11B 7/00* (2006.01)
*G11B 7/24* (2013.01)
(Continued)

(52) U.S. Cl.
CPC .......... *G11B 7/00736* (2013.01); *G11B 19/122* (2013.01); *G11B 20/1217* (2013.01); *G11B 27/329* (2013.01); G11B 2020/122 (2013.01); G11B 2020/1287 (2013.01); G11B 2020/1292 (2013.01); G11B 2220/20 (2013.01); G11B 2220/232 (2013.01); G11B 2220/235 (2013.01); G11B 7/24038 (2013.01)
USPC ............... 369/275.1; 369/275.3; 369/53.2; 369/53.41; 369/47.1

(58) Field of Classification Search
None
See application file for complete search history.

(56) References Cited

U.S. PATENT DOCUMENTS 6,097,683 A    8/2000 Ohara et al.
2005/0063261 A1    3/2005 Kim et al.
(Continued)

FOREIGN PATENT DOCUMENTS

JP    63-171441    7/1988
JP    06-131801    5/1994
(Continued)

OTHER PUBLICATIONS

International Search Report, w/ English translation thereof, issued in International Application No. PCT/JP2011/003283 dated Sep. 13, 2011.

*Primary Examiner* — Muhammad N Edun
(74) *Attorney, Agent, or Firm* — McDermott Will & Emery LLP

(57) ABSTRACT

When recording layers were provided on both the front and back sides of an optical disk in order to increase the recording capacity, whether the reproducing surface of the optical disk taken out of the cartridge was the front side or the back side could not be determined. This problem can be solved by adding to the BCA, in addition to disk identification information: type information indicating whether a recording surface is provided on one side or both sides; side information indicating whether the surface with which reproduction is being performed is side A or side B; recording layer quantity information indicating whether the disk has a single layer or a double layer; information indicating the areas other than the BCA and the directions in which data on the read-in, data zones, and read-out are recorded/reproduced; and information indicating the presence/absence of a disk cartridge.

9 Claims, 18 Drawing Sheets

| EMBODIMENT | SURFACE A | | | | SURFACE B | | | |
|---|---|---|---|---|---|---|---|---|
| | BCA | | | DIRECTION OF ROTATION OF DISC | BCA | | | DIRECTION OF ROTATION OF DISC |
| | DIRECTION | IDENTIFICATION OF DIRECTION | DATA | | DIRECTION | IDENTIFICATION OF DIRECTION | DATA | |
| 1 | COUNTERCLOCKWISE | – | SURFACE INFORMATION | COUNTERCLOCKWISE | COUNTERCLOCKWISE | – | SURFACE INFORMATION | COUNTERCLOCKWISE |
| 2 | COUNTERCLOCKWISE | – | SURFACE INFORMATION/DIRECTION OF ROTATION | COUNTERCLOCKWISE | COUNTERCLOCKWISE | – | SURFACE INFORMATION/DIRECTION OF ROTATION | CLOCKWISE |
| 3 | COUNTERCLOCKWISE | DATA ANALYSIS OF BCA-LDC OR THE LIKE | SURFACE INFORMATION/DIRECTION OF ROTATION | COUNTERCLOCKWISE | CLOCKWISE | DATA ANALYSIS OF BCA-LDC OR THE LIKE | SURFACE INFORMATION/DIRECTION OF ROTATION | CLOCKWISE |
| 4 | COUNTERCLOCKWISE | MARKER | SURFACE INFORMATION/DIRECTION OF ROTATION | COUNTERCLOCKWISE | CLOCKWISE | MARKER | SURFACE INFORMATION/DIRECTION OF ROTATION | CLOCKWISE |

(51) Int. Cl.
  *G11B 7/007* (2006.01)
  *G11B 19/12* (2006.01)
  *G11B 20/12* (2006.01)
  *G11B 27/32* (2006.01)
  *G11B 7/24038* (2013.01)

(56) References Cited

U.S. PATENT DOCUMENTS

| | | | |
|---|---|---|---|
| 2005/0094546 A1 | 5/2005 | Katayama et al. | |
| 2007/0127352 A1* | 6/2007 | Oshima et al. | 369/275.1 |
| 2007/0280095 A1 | 12/2007 | Yoshida et al. | |
| 2008/0310292 A1* | 12/2008 | Nagai et al. | 369/275.3 |

FOREIGN PATENT DOCUMENTS

| | | |
|---|---|---|
| JP | 08-045195 | 2/1996 |
| JP | 2000-156064 A | 6/2000 |
| JP | 2002-036726 A | 2/2002 |
| JP | 2004-273037 A | 9/2004 |
| JP | 2004-348963 | 12/2004 |
| JP | 2005-141809 A | 6/2005 |
| JP | 2005-524192 A | 8/2005 |
| JP | 2008-010079 A | 1/2008 |
| JP | 2010-086596 A | 4/2010 |
| JP | 2011-018442 A | 1/2011 |
| WO | 98/58368 A1 | 12/1998 |
| WO | 2009/040926 | 4/2009 |
| WO | 2010/038333 A1 | 4/2010 |
| WO | 20101143399 A1 | 12/2010 |

* cited by examiner

FIG.1
| Bit<br>Byte | 7 | 6 | 5 | 4 | 3 | 2 | 1 | 0 |
|---|---|---|---|---|---|---|---|---|
| 0 | \multicolumn{6}{c}{IDENTIFIER = 111111} | | SEQUENCE = 00 | |
| 1 | \multicolumn{8}{c}{Book Type} |||||||| 
| 2 | Version number |||||||| 
| 3 | RECORDING LAYER INFORMATION |||||||| 
| 4 | OPPOSITE RECORDING LAYER INFORMATION |||||||| 
| 5 | Reserved |||||||| 
| ⋮ | |||||||| 
| 15 | Reserved |||||||| 
FIG.2
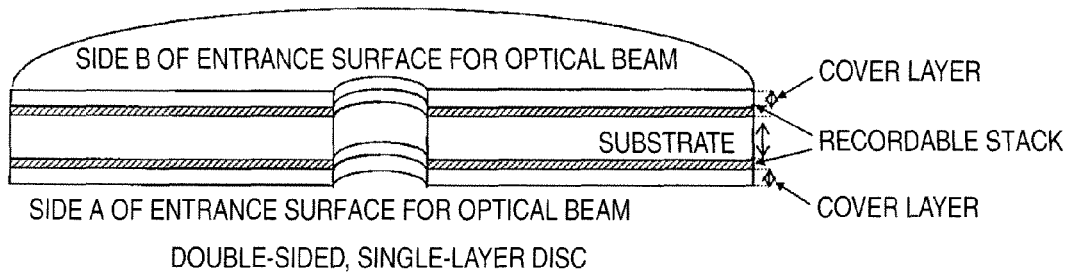
DOUBLE-SIDED, SINGLE-LAYER DISC
FIG.3
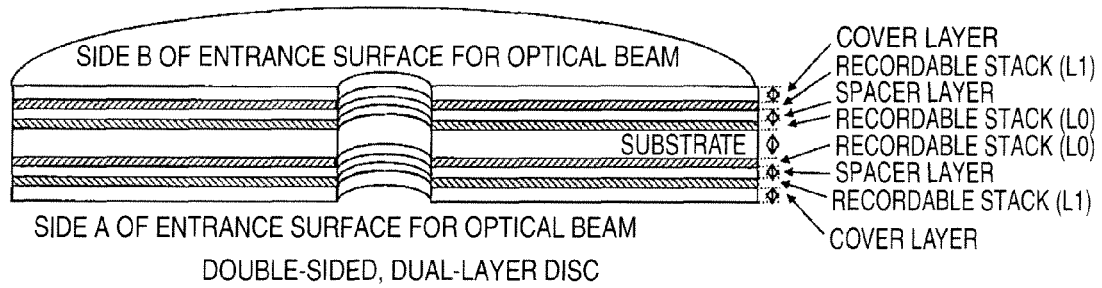
DOUBLE-SIDED, DUAL-LAYER DISC Byte 3: RECORDING LAYER INFORMATION
b7 b6 b5 b4 b3 b2 b1 b0

| b7 | b6 | b5 b4 b3 | b2 | b1 | b0 |
|---|---|---|---|---|---|
| Type | Side | Number of Recording Layers | Spiral Direction | Reserved | Cartridge |

Byte 4: OPPOSITE RECORDING LAYER INFORMATION
b7 b6 b5 b4 b3 b2 b1 b0

| b7 | b6 | b5 b4 b3 | b2 | b1 | b0 |
|---|---|---|---|---|---|
| Type | Side | Number of Recording Layers | Spiral Direction | Reserved | Cartridge |

SINGLE-LAYER DISC

DUAL-LAYER DISC

1 SCRAMBLED DATA FRAME 2052 byte (d0, 0~d2051, 0)  (d0, 31~d2051, 31)
← 32 SCRABLED DATA FRAMES →

304 columns 216 rows

DATA BLOCK (d0, 0~d2051, 0)  (d0, 31~d2051, 31)

304 columns 246 rows

DATA BLOCK 216 rows

PARITY 32 rows

LDC BLOCK

ACCESS BLOCK

BIS BLOCK

BIS CLUSTER

ECC CLUSTER

FIG.22

| Data bits (BEFORE MODULATION) | Data bits (AFTER MODULATION) |
|---|---|
| 00 00 00 00 | 010 100 100 100 |
| 00 00 10 00 | 000 100 100 100 |
| 00 00 00 | 010 100 000 |
| 00 00 01 | 010 100 100 |
| 00 00 10 | 000 100 000 |
| 00 00 11 | 000 100 100 |
| 00 01 | 000 100 |
| 00 10 | 010 000 |
| 00 11 | 010 100 |
| 01 | 010 |
| 10 | 001 |
| 11 | 000 (IF PRECEDING MODULATION BITS = xx1) |
|  | 101 (IF PRECEDING MODULATION BITS = xx0) |
| 11 01 11 | 001 000 000 (IF NEXT MODULATION BITS = 010) |
| 00 00 | 010 100 (IF NEXT IS SYNC CODE) |
| 00 | 000 (IF NEXT IS SYNC CODE) |

FIG.23

| Sync number | sync | sync ID |
|---|---|---|
| FS0 | #01 010 000 000 010 000 000 010 | 000 001 |
| FS1 | #01 010 000 000 010 000 000 010 | 010 010 |
| FS2 | #01 010 000 000 010 000 000 010 | 101 000 |
| FS3 | #01 010 000 000 010 000 000 010 | 100 001 |
| FS4 | #01 010 000 000 010 000 000 010 | 000 100 |
| FS5 | #01 010 000 000 010 000 000 010 | 001 001 |
| FS6 | #01 010 000 000 010 000 000 010 | 010 000 |
| FS7 | #01 010 000 000 010 000 000 010 | 100 101 |
| FS8 | #01 010 000 000 010 000 000 010 | 101 010 |

FIG.24
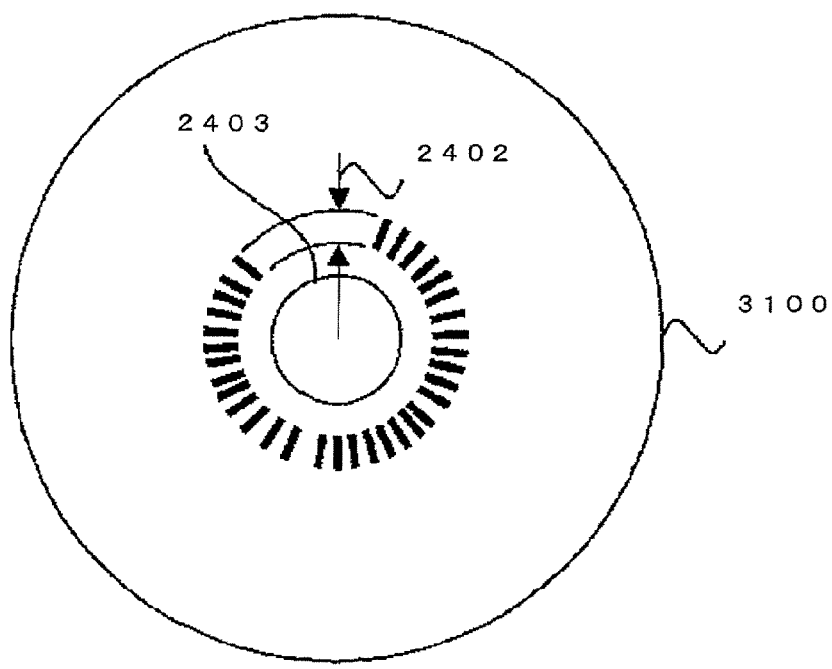
FIG.25
| SOURCE DATA | MODULATION PATTERN | |
|---|---|---|
| | SYNCHRONIZATION PORTION | DATA PORTION |
| 00 | 010 | 1000 |
| 01 | 010 | 0100 |
| 10 | 010 | 0010 |
| 11 | 010 | 0001 |
FIG.26
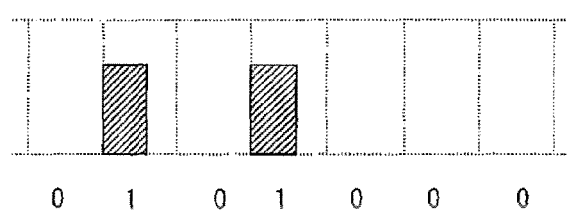

FIG.27

| SB33 | 00h | 00h | 00h | 00h |
|---|---|---|---|---|
| SB00 | I0,0 | I0,1 | I0,2 | I0,3 |
| SB00 | I0,4 | I0,5 | I0,6 | I0,7 |
| SB00 | I0,8 | I0,9 | I0,10 | I0,11 |
| SB00 | I0,12 | I0,13 | I0,14 | I0,15 |
| SB01 | C0,0 | C0,1 | C0,2 | C0,3 |
| SB01 | C0,4 | C0,5 | C0,6 | C0,7 |
| SB01 | C0,8 | C0,9 | C0,10 | C0,11 |
| SB01 | C0,12 | C0,13 | C0,14 | C0,15 |
| SB02 | I1,0 | I1,1 | I1,2 | I1,3 |
| SB02 | I1,4 | I1,5 | I1,6 | I1,7 |
| SB02 | I1,8 | I1,9 | I1,10 | I1,11 |
| SB02 | I1,12 | I1,13 | I1,14 | I1,15 |
| SB03 | C1,0 | C1,1 | C1,2 | C1,3 |
| SB03 | C1,4 | C1,5 | C1,6 | C1,7 |
| SB03 | C1,8 | C1,9 | C1,10 | C1,11 |
| SB03 | C1,12 | C1,13 | C1,14 | C1,15 |
| SB10 | I2,0 | I2,1 | I2,2 | I2,3 |
| SB10 | I2,4 | I2,5 | I2,6 | I2,7 |
| SB10 | I2,8 | I2,9 | I2,10 | I2,11 |
| SB10 | I2,12 | I2,13 | I2,14 | I2,15 |
| SB11 | C2,0 | C2,1 | C2,2 | C2,3 |
| SB11 | C2,4 | C2,5 | C2,6 | C2,7 |
| SB11 | C2,8 | C2,9 | C2,10 | C2,11 |
| SB11 | C2,12 | C2,13 | C2,14 | C2,15 |
| SB12 | I3,0 | I3,1 | I3,2 | I3,3 |
| SB12 | I3,4 | I3,5 | I3,6 | I3,7 |
| SB12 | I3,8 | I3,9 | I3,10 | I3,11 |
| SB12 | I3,12 | I3,13 | I3,14 | I3,15 |
| SB13 | C3,0 | C3,1 | C3,2 | C3,3 |
| SB13 | C3,4 | C3,5 | C3,6 | C3,7 |
| SB13 | C3,8 | C3,9 | C3,10 | C3,11 |
| SB13 | C3,12 | C3,13 | C3,14 | C3,15 |
| SB32 | | | | |

|      | SYNC BODY         | SYNC ID           |
|------|-------------------|-------------------|
| SB33 | 010 0001 001 0100 | 010 0001 010 0001 |
| SB00 | 010 0001 001 0100 | 010 1000 010 1000 |
| SB01 | 010 0001 001 0100 | 010 1000 010 0100 |
| SB02 | 010 0001 001 0100 | 010 1000 010 0010 |
| SB03 | 010 0001 001 0100 | 010 1000 010 0001 |
| SB10 | 010 0001 001 0100 | 010 0100 010 1000 |
| SB11 | 010 0001 001 0100 | 010 0100 010 0100 |
| SB12 | 010 0001 001 0100 | 010 0100 010 0010 |
| SB13 | 010 0001 001 0100 | 010 0100 010 0001 |
| SB32 | 010 0001 001 0100 | 010 0001 010 0010 |

| FFh | I0,I1,I2........I15 | C0,C1,C2.....C15 | C16,C17.....C31 |
|-----|---------------------|------------------|-----------------|
| 200Byte | 16Byte | 16Byte | 16Byte |

| Bit / Byte | 7 | 6 | 5 | 4 | 3 | 2 | 1 | 0 |
|---|---|---|---|---|---|---|---|---|
| 0 | Content code ||||||||
| 1 | Content ||||||||
| ⋮ |  |  |  |  |  |  |  |  |
| 15 |  |  |  |  |  |  |  |  |

FIG.37

| EMBODIMENT | SURFACE A | | | | SURFACE B | | | |
|---|---|---|---|---|---|---|---|---|
| | BCA | | | DIRECTION OF ROTATION OF DISC | BCA | | | DIRECTION OF ROTATION OF DISC |
| | DIRECTION | IDENTIFICATION OF DIRECTION | DATA | | DIRECTION | IDENTIFICATION OF DIRECTION | DATA | |
| 1 | COUNTERCLOCKWISE | – | SURFACE INFORMATION | COUNTERCLOCKWISE | COUNTERCLOCKWISE | – | SURFACE INFORMATION | COUNTERCLOCKWISE |
| 2 | COUNTERCLOCKWISE | – | SURFACE INFORMATION/DIRECTION OF ROTATION | COUNTERCLOCKWISE | COUNTERCLOCKWISE | – | SURFACE INFORMATION/DIRECTION OF ROTATION | CLOCKWISE |
| 3 | COUNTERCLOCKWISE | DATA ANALYSIS OF BCA-LDC OR THE LIKE | SURFACE INFORMATION/DIRECTION OF ROTATION | COUNTERCLOCKWISE | CLOCKWISE | DATA ANALYSIS OF BCA-LDC OR THE LIKE | SURFACE INFORMATION/DIRECTION OF ROTATION | CLOCKWISE |
| 4 | COUNTERCLOCKWISE | MARKER | SURFACE INFORMATION/DIRECTION OF ROTATION | COUNTERCLOCKWISE | CLOCKWISE | MARKER | SURFACE INFORMATION/DIRECTION OF ROTATION | CLOCKWISE |

FIG.38

| Byte \ Bit | 7 | 6 | 5 | 4 | 3 | 2 | 1 | 0 |
|---|---|---|---|---|---|---|---|---|
| 0 | IDENTIFIER = 000001 | | | | | | SEQUENCE = 00 | |
| 1 | ID | | | | | | | |
| 2 | | | | | | | | |
| 3 | ID NUMBER | | | | | | | |
| ... | | | | | | | | |
| 15 | | | | | | | | |

DISK-SHAPED RECORDING MEDIUM AND RECORDING/REPRODUCING DEVICE FOR DISK-SHAPED RECORDING MEDIUM

RELATED APPLICATION

This application is the U.S. National Phase under 35 U.S.C. §371 of International Application No. PCT/JP2011/003283, filed on Jun. 10, 2011, the disclosure of which Application is incorporated by reference herein.

TECHNICAL FIELD

The present invention relates to an optical information recording medium and recording reproducing device.

BACKGROUND ART

In the past, owing to higher densities using shorter wavelengths of semiconductor lasers and higher numerical apertures (NA) of objective lenses, greater capacities from CD to DVD and then to Blu-ray Disc (Trademark) have been accomplished. In recent years, however, the trend is toward creating multiple layers rather than higher densities to achieve greater capacities. BDXL (Trademark) has been standardized. That is, BD discs having multiple layers have been created. A BD disc having 33 GB per layer and achieving 100 GB with three layers is available. Furthermore, a BD disc having 32 GB per layer and achieving 128 GB with four layers is available. Because broadcast media have evolved and there are increasing amounts of moving picture contents, amounts of data handled by individuals and enterprises have continued to increase. It can be expected that there will be a demand for storage media having greater capacities in the future. One method available for achieving greater capacities consists of making laser light enter from both surfaces of an optical disc and forming recording layers on both front and rear surfaces of the disc. In optical discs, fingerprints and dust on the recording surfaces may affect the quality of signal when recording or playback is made. In some cases, cartridges are used to prevent adhesion of fingerprints and dust on the recording surfaces.

As set forth in Patent literature 1, a region known as a burst cutting area (hereinafter referred to as the BCA) is formed on the inner side of an optical disc such as CD, DVD, or Blu-ray Disc (Trademark). Optical disc drives, players, and recorders are required to provide reading compatibility with various discs. It has become increasingly difficult to discriminate discs. One means to discriminate discs is to contain information intrinsic to each disc within the BCA of the disc. The BCA is not essential to the existing DVD disc using a laser of a wavelength of 650 nm. However, in the Blu-ray Disc (Trademark) using a laser of a wavelength of 405 nm, information about individual identification codes and disc copy protection is included and so the BCA has become more important and is an essential item of the disc. On the other hand, Patent reference 2 discloses that the lead-in area on the inner side of a recordable Blu-ray Disc (Trademark), i.e., BD-RE, is partitioned into a first guard area (Guard 1), a PIC (Permanent Information & Control data) area, a second guard area (Guard 2), information 2 area (Info 2), an OPC (Optimum Power Control) area, and other areas. Furthermore, it is set forth that the PIC area is used as a region previously recorded with data.

CITATION LIST

Patent Literature

Patent Literature 1: JP-A-2011-18442
Patent Literature 2: JP application No. 2004-502291

SUMMARY OF INVENTION

Technical Problem

When the recording capacity of an optical disc is increased by forming recording layers on both front and rear surfaces, it is impossible to discern whether the reading surface of the optical disc which has been taken out of the cartridge is the front surface or rear surface.

Accordingly, it is an object of the present invention to shorten the setup time of an optical disc having recording layers on its both surfaces.

Solution to Problem

As one example, the above object is achieved by contriving information recorded in each block of the BCA.

Advantageous Effects of Invention

According to the present invention, the setup time of the optical disc having recording layers on its both surfaces can be shortened.

BRIEF DESCRIPTION OF DRAWINGS

FIG. 1 is a diagram showing BCA data with identifier 111111.
FIG. 2 is a structural diagram of a single-layer, double-sided disc.
FIG. 3 is a structural diagram of a double-layer, double-sided disc.

FIG. 22 is a diagram showing a 1-7 modulation used on a disc.

FIG. 23 is a table of a sync signal pattern of sync frames.

FIG. 24 is a structural diagram showing the position of a BCA in a disc, used in the present invention.

FIG. 25 is a conversion table listing a modulation rule of a BCA in a disc, used in the present invention.

FIG. 26 is a diagram showing the shape of recording of a BCA on a disc, used in the present invention.

FIG. 27 is a structural diagram of BCA data in a disc, used in the present invention.

FIG. 37 is a table showing the relationship between data spiral direction, fundamental disc information, and embodiments.

FIG. 38 is a diagram showing BCA data with identifier 000001.

DESCRIPTION OF EMBODIMENTS

Figures 4, 5, 6:
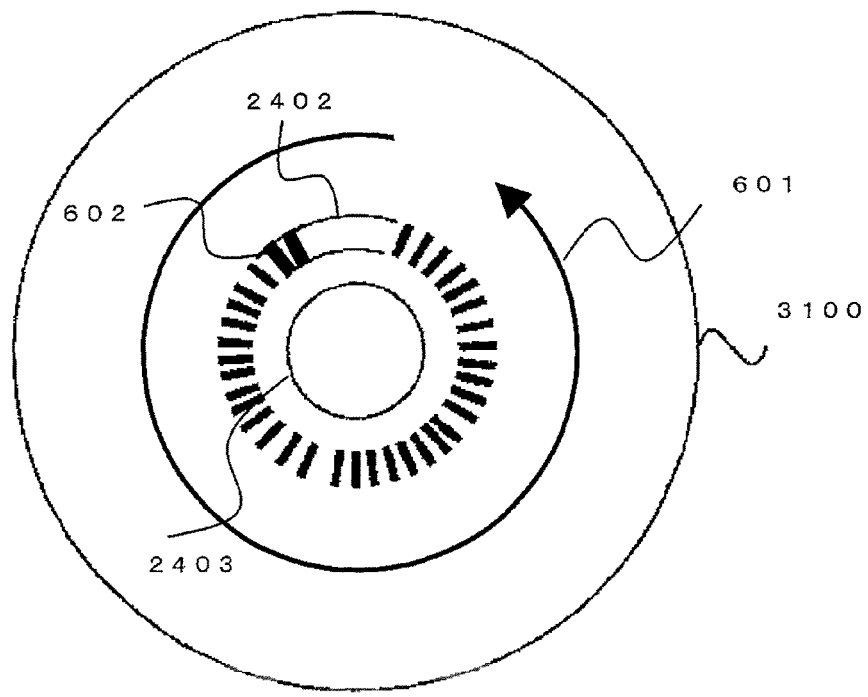
FIG. 4 is a diagram showing the fundamental disc information data of the BCA data.
FIG. 5 is a diagram showing the fundamental disc information data of the BCA data on the other surface.
FIG. 6 is a structural diagram showing a counterclockwise spiral direction in a disc.

FIG. 37 shows BCA reading directions in various embodiments of the present application, method of identifying BCA reading directions, information included in the BCA for identification of front and rear surfaces or surfaces A and B, and directions in which data in areas (excluding the BCA) (i.e., lead-in, data-zone, and lead-out) are recorded and reproduced. In the present embodiment, BCA reading direction and directions in which data (such as lead-in data, data-zone data, and lead-out data) are recorded and reproduced indicate the directions of rotation when a disc is viewed from a recording surface that is to be recorded and reproduced, indicating directions in terms of counterclockwise and clockwise. In the present expression, on a Blu-ray Disc (Trademark) of a disc structure of a single layer (FIG. 8) or a double layer (FIG. 9) having a recording surface or surfaces on one side, the BCA reading direction and data (lead-in, data-zone, and lead-out) reading direction are both counterclockwise.

Embodiment 1 is an embodiment in a case where both surfaces A and B have the same recording layer structure as the Blu-ray Disc (Trademark). In embodiments 2, 3, and 4, surface A has the same recording layer structure as the Blu-ray Disc (Trademark), but on surface B, the direction in which lead-in, data-zone, and lead-out data are recorded and reproduced is opposite to the direction on surface A, i.e., clockwise. In embodiment 2, the BCA reading direction on surface B is the same as on surface A, i.e., counterclockwise. In embodiments 3 and 4, the BCA reading direction on surface B is reverse to the direction on surface A, i.e., clockwise.

[Optical Disc and Optical Disc Recording/Reproducing Device]

An optical disc and recording/reproducing device therefor being a first embodiment of the present application is described by referring to FIGS. 1-5, 10-31, 34-36, and 38.

[Disc (BCA Format)]

The BCA data format for a double-sided optical disc of the present invention is described.

FIG. 38 shows the BCA data format of data blocks permitting individual discrimination. In FIG. 38, longitudinal Byte indicates where each byte of data is located. Horizontal Bit indicates where each bit of data is located. Byte 0 of the BCA is a content code, where Bits 7 to 2 are an identifier. In this case, it is assumed that 000001 is set. Bits 1 and 0 of Byte 0 are a sequence number. When the BCA consists of a plurality of data blocks, the sequence number indicates where the sequence is located. The sequence numbers will be described later in connection with the description of the BCA. Byte 1 and Byte 2 are an identification code (IDs) of a manufacturer. Bytes 3 to Byte 15 are a unique number attached to each disc. That is, the number permits individual discrimination. Therefore, the recording/reproducing device can obtain an amount of individual information sufficient to provide fine copy management and disc management using the present information. Recordings are made while assigning a different individual identification number to each disc. In the case of a double-sided disc, the same ID (manufacturer ID code) and identification number (individual identification number) are assigned to the BCAs of both surfaces A and B.

FIG. 1 shows a data block format used in the BCA and permitting discrimination among optical disc types. In FIG. 1, vertical Byte indicates where each Byte of data is located. Horizontal Bit indicates where each Bit of data is located. Byte 1 of the BCA is a content code including Bits 7 to 2 which are an identifier. In this case, it is assumed that 111111 is set. Bits 1 and 0 of Byte 0 are a sequence number. When the BCA consists of a plurality of data blocks, the sequence number indicates where each sequence is located. Byte 1 indicates the type of a standard with which the optical disc is compliant. A disc type such as DVD, HD-DVD, or Blu-ray Disc (Trademark) is shown. Besides, recording characteristics such as ROM, Recordable, or Rewritable are shown. Byte 2 is a version number of the standard with which the disc is compliant. A recording/reproducing device can judge the presence or absence of recording/reading compatibility or reading compatibility with the present optical disc from the present information. Byte 3 indicates the fundamental physical characteristic information regarding the recording surface being read. Byte 4 indicates the fundamental physical characteristic information regarding the recording surface facing away from the reading surface. FIGS. 4 and 5 show the fundamental physical characteristics of Bytes 3 and 4. The fundamental physical characteristics include the presence or absence of a disc cartridge. Besides, type information indicating whether the recording surface is one surface or both surfaces is included. Also, surface information indicating whether the surface is A or B is included. Information indicating the number of recording layers, i.e., whether single layer or double layer, is included. Information about areas excluding the BCA (information that is unnecessary for embodiment 1) is included. Information about the direction in which lead-in, data-zone, and lead-out data are recorded and reproduced is included. Byte 3 of the BCA of surface A of a single-layer, single-sided optical disc or a double-layer, double-sided optical disc placed in a disc cartridge has recorded fundamental physical characteristic information on the reading side, the recorded information indicating both surfaces, surface A, single layer, counterclockwise, and the presence of a disc cartridge. Byte 4 includes recorded fundamental physical characteristic information on the opposite surface, the fundamental information indicating both surfaces, surface B, two layers, counterclockwise, and the presence of a disc cartridge. On the other hand, Byte 3 of the BCA on surface B includes recorded fundamental physical characteristic information on the surface on the reading side, the information indicating both surfaces, surface B, two layers, counterclockwise, and the presence of a disc cartridge. Byte 4 has recorded fundamental physical characteristic information on the opposite surface, the information indicating both surfaces, surface A, single layer, counterclockwise, and the presence of a disc cartridge. Byte 3 of the BCA of a bare two-layered optical disc having a recording surface on only one side and using no disc cartridge includes recorded fundamental physical characteristic information which indicates one surface, surface A, two layers, counterclockwise, and the absence of a disc cartridge.

In this way, by recording information about disc type, recording characteristics, version number of a standard with which the disc is compliant, type information, surface information, and the number of recording layers in the BCA, the information permitting discrimination of the type of the optical disc, disc discrimination that is needed to be done either when the disc is inserted into the recording/reproducing device or when the power supply is turned on is facilitated. A setup of various parameters can be made reliably, quickly, and easily. Furthermore, information regarding disc type and state can be offered to the host quickly.

[Shapes of Discs]

Figure 8:
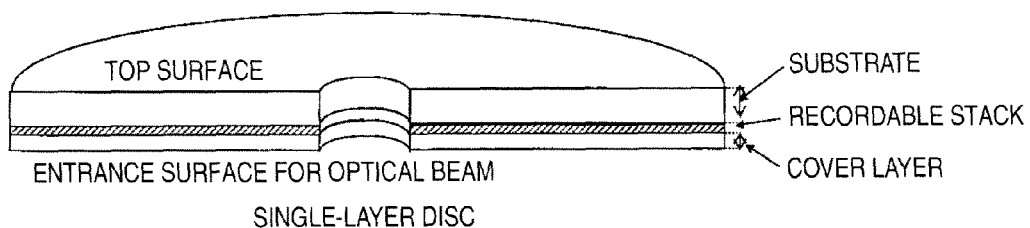
FIG. 8 is a structural diagram of a single-layer disc.
Figure 9:
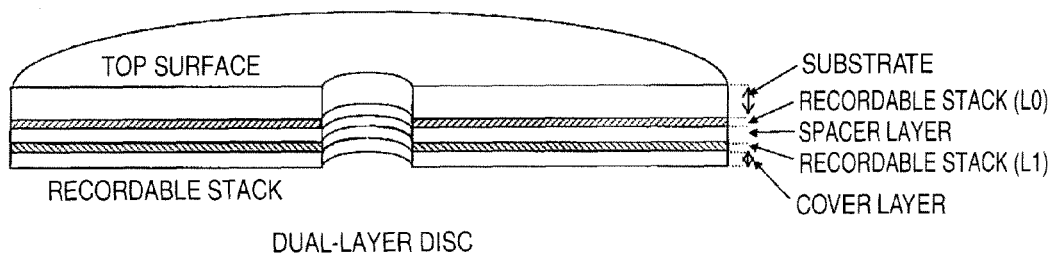
FIG. 9 is a structural diagram of a double-layer disc.

The shapes of optical discs used in the present invention are described. FIG. 2 shows a single-layered, double-sided recordable optical disc. FIG. 3 shows a double-layered, double-sided optical disc. In the single-layered, double-sided optical disc shown in FIG. 2, recording surfaces exist on both surfaces A and B. A cover layer protecting the recording surface A or B, a recording layer consisting of a recording layer on which signal is recorded or of a reflective film, and an underlying substrate layer are formed in this order from the recording surface A or B toward the center of the disc. Also, in the double-layered, both-sided optical disc shown in FIG. 3, recording layers exist on both surfaces A and B. A cover layer protecting the recording surface A or B, a recording layer (L1) on which signal is recorded, a space layer forming a space with another recording layer, another recording layer (L0) on which signal is recorded, and a deeper substrate layer are formed in turn from the recording surface A or B toward the center of the disc. Each of FIGS. 8 and 9 shows a single-sided recordable optical disc. The structure of the recording surface is similar to the cases of FIGS. 2 and 3.

Figure 10:
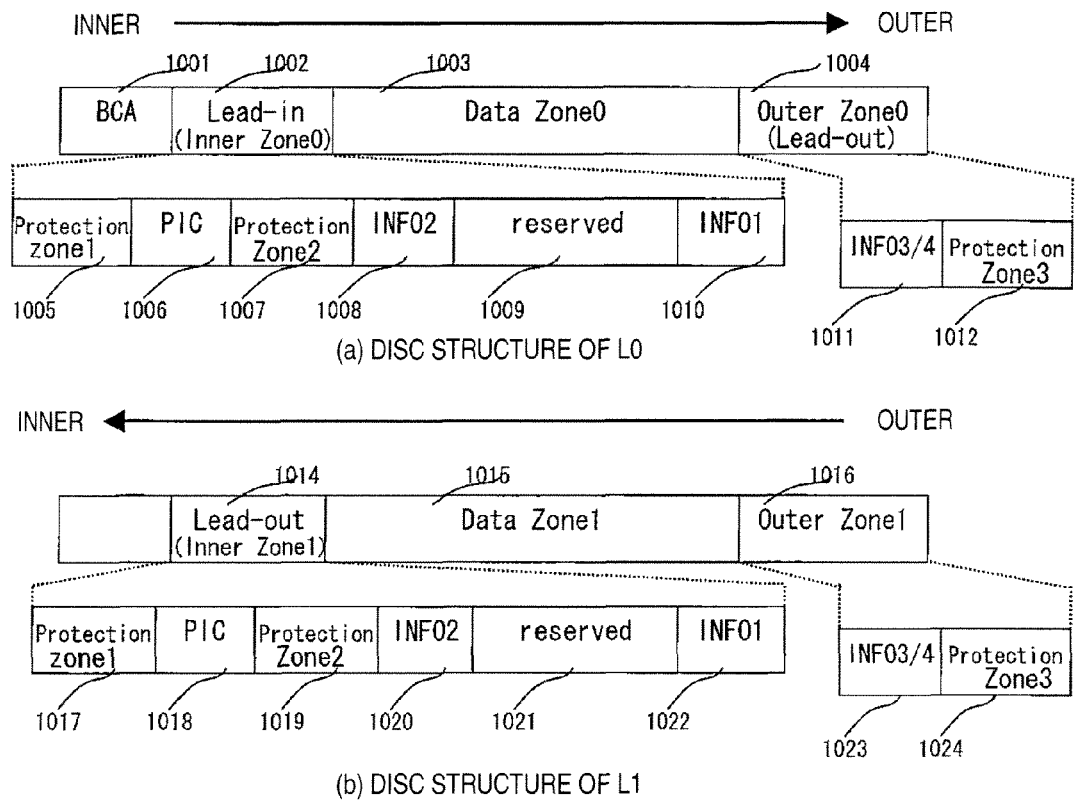
FIG. 10 is a structural diagram of recording layers of a disc.

The structures of the recording layers of the single-layered, double-sided optical disc and the double-layered, double-sided optical disc are shown in FIG. 10. FIG. 10 schematically shows a cross section of each disc. The left side shows the inner side, while the right side shows the outer side. The L0 disc structure of FIG. 10(a) shows the disc structures of recording layers L0 of the single-layered, double-sided optical disc and the double-layered, double-sided optical disc. The L1 disc structure of FIG. 10(b) shows the disc structure of the recording layer L1 of the double-layered, double-sided optical disc.

In the L0 disc structure of FIG. 10(a), indicated by 1001 is a BCA (Burst Cutting Area) in which information intrinsic to the disc is recorded. Indicated by 1002 is Inner Zone 0 in which information about attributes concerning the disc, control information, and so on are recorded. This Inner Zone 0 (1002) is also referred to as the Lead-in. Indicated by 1003 is Data Zone 0 in which user data such as AV data or the like is recorded. Indicated by 1004 is Outer Zone 0 in which control information and so on are recorded. The Inner Zone 0 (1002) consists of Protection Zone 1 (1005), PIC (1006), Protection Zone 2 (1007), INFO02 (1008), reserved (1009), and INFO01 (1010). The Protection Zone 1 (1005) is an area for isolating the BCA (1001) and PIC (1006) from each other. Data have been previously recorded in the Protection Zone 1 (1005) and PIC (1006). New data are recorded in the other areas. The Protection Zone 1 (1005) is an area for isolating the more inner side and the PIC (1006) from each other. Disc information to be stored permanently, i.e., information about disc type and recording characteristics, information about disc size, information about version of a standard with which the disc is compliant, fundamental physical characteristic information such as information about the number of recording layers (e.g., whether single layer or two layers), information about the presence or absence of the BCA, and information (such as information about a recommended write strategy of L0 and recording rate) is stored in the PIC (1006). Thus, a high-frequency modulated (HFM) group is formed. The Protection Zone 2 (1007) is an area for isolating the PIC (1006) and the INFO02 (1008) from each other. Control information is recorded in the INFO02 (1008). Reserved (1009) is a reserved area. Control information is recorded in the INFO01 (1010). The Outer Zone 0 (1004) consists of INFO3/4 (1011) and Protection Zone 3 (1012). Control information is recorded in the INFO3/4 (1011). The Protection Zone 3 (1012) isolates the INFO3/4 (1011) from the further outer side. The arrow from the inner side toward the outer side of the L0 disc structure of FIG. 10(a) indicates that data is recorded on a continuous spiral track, from the inner side toward the outer side of the recording layer L0 of the single-layered, double-sided optical disc and the double-layered, double-sided optical disc.

In the L1 disc structure of FIG. 10(b), indicated by 1014 is Inner Zone 1 in which information about attributes about the disc, control information, and so on are recorded. This is also referred to as Lead-out. Indicated by 1015 is Data Zone 0 in which user data such as AV data is recorded. Indicated by 1016 is Outer Zone 1 in which control information and so on are recorded. The Inner Zone 1 (1014) consists of Protection Zone 1 (1017), PIC (1018), Protection Zone 2 (1019), INFO02 (1020), reserved (1021), and INFO01 (1022). The Protection Zone 1 (1005) and PIC (1006) are areas in which data have been previously recorded. New data are recorded in the other areas. The Protection Zone 1 (1017) is an area for isolating the more inner side and the PIC (1018) from each other. Disc information to be stored permanently, i.e., information about disc type and recording characteristics, information about disc size, information about the version of a standard with which the disc is compliant, fundamental physical characteristic information such as information about the number of recording layers (e.g., whether single layer or two layers), information about the presence or absence of the BCA, and information (such as information about recommended write strategy of L1 and recording rate) is stored in the PIC (1018). A high-frequency modulated (HFM)) group is formed. The Protection Zone 2 (1019) is an area for isolating the PIC (1018) and the INFO02 (1020) from each other. Control information is recorded in the INFO02 (1020). The reserved (1021) is a reserved area. Control information is recorded in INFO01 (1022). The Outer Zone 1 (1016) consists of INFO3/4 (1023) and Protection Zone 3 (1024). Control information is recorded in the INFO3/4 (1023). The Protection Zone 3 (1024) isolates INFO3/4 (1023) from the further outer portion. The arrow directed from the outer side toward the inner side of the L1 disc structure of FIG. 10(b) indicates that data is recorded on a continuous helical track from the outer surface toward the inner surface of the recording layer L1 of the double-layered, double-sided optical disc having two layers on each surface.

Figure 34:
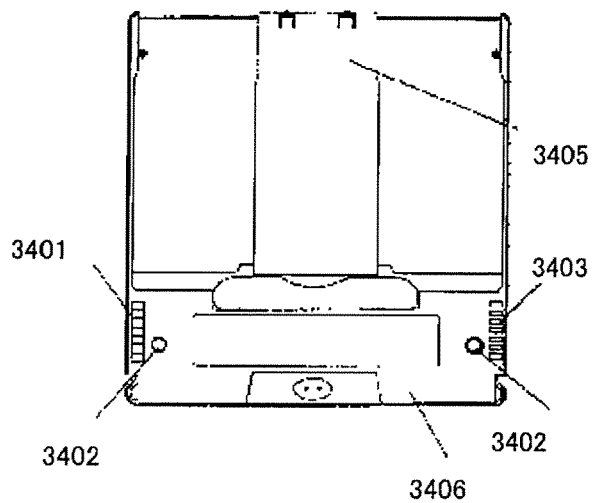
FIG. 34 is a structural diagram of (the front surface of) a disc cartridge.
Figure 35:
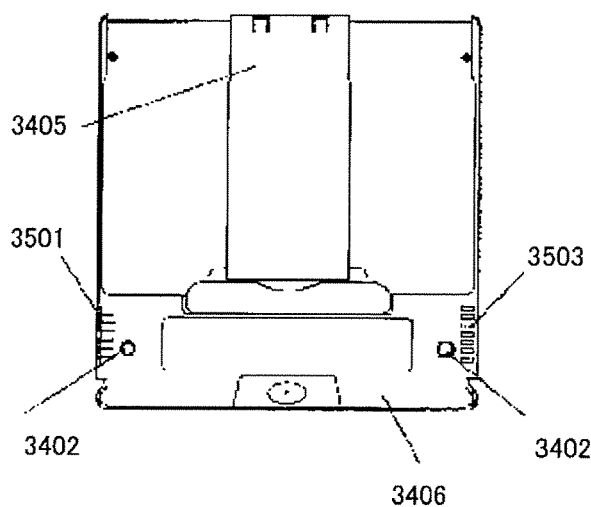
FIG. 35 is a structural diagram of (the rear surface of) the disc cartridge.

The optical discs having recording surfaces on both surfaces as shown in FIGS. 2 and 3 make use of a disc cartridge during use in order to prevent adhesion of hands grease, smudges, and scratching of the recording surfaces. FIG. 34 shows the rear surface of the disc cartridge. FIG. 35 shows the front surface of the disc cartridge. Here, both surfaces of the disc cartridge have the same shape because the cartridge is compliant with both surfaces. As shown in FIGS. 34 and 35, disc information holding portions 3401, 3501, timing information holding portions 3403, 3503, a cartridge positioning hole 3402, a shutter 3405, and so on are formed on the body 3406 of the cartridge. Since the present disc cartridge is compliant with both surfaces, the disc information holding portions 3401, 3501, and timing information holding portions 3403, 3503 which correspond to both surfaces are respectively disposed on the opposite surfaces of the disc cartridge. Seven disc information holding portions 3401 or 3501 are arranged per disc surface. Information is set by the presence or absence of concavities on the cartridge surface. Furthermore, seven timing information holding portions 3403 or 3503 are arranged in conformity with the number of the disc information holding portions 3401 or 3501. The timing information holding portions 3403 and 3503 set information by the presence or absence of concavities on the cartridge surface.

The information about the fundamental physical characteristics of the PICs (1006 and 1008) present on the inner side of the disc does not always need to contain type information indicating whether the recording layer is one surface or two surfaces (i.e., fundamental physical characteristic information recorded in the BCA), surface information indicating whether the surface is A or B, and the information indicating whether a disc cartridge is present or absent. When these sets of information are not contained in the PICs, the stamper as used for single-sided discs can be used for both surfaces A and B of double-sided discs. This suppresses the cost of manufacturing double-sided discs. The discs can be supplied economically.

[Processing for Encoding of Data]

Figure 11:
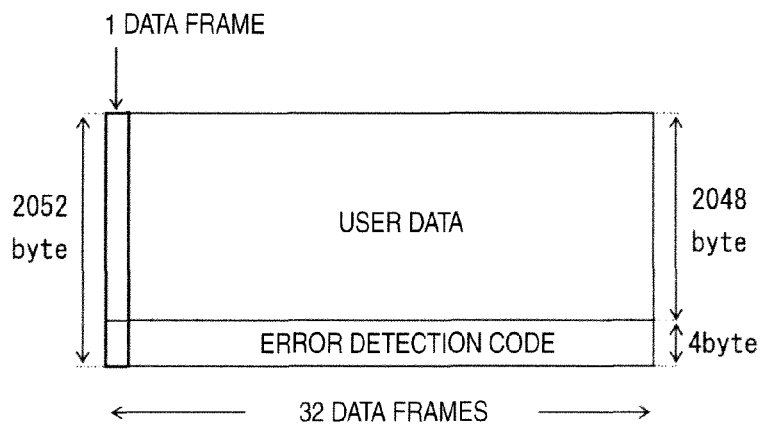
FIG. 11 is a structural diagram of data frames of a disc.
Figure 12:
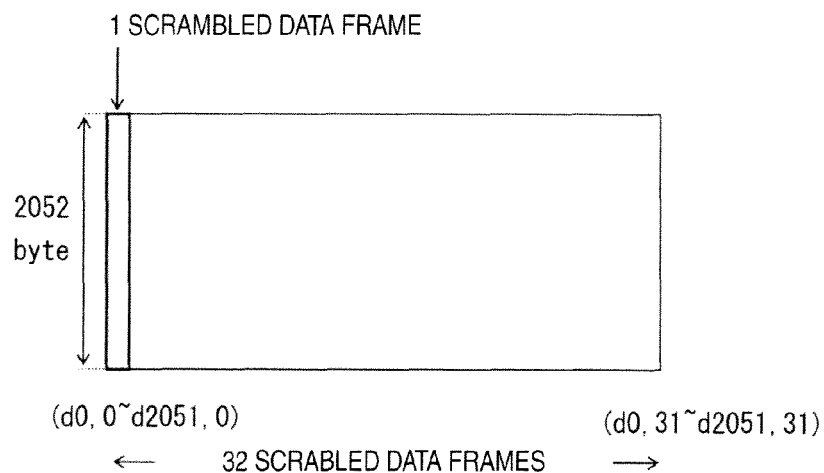
FIG. 12 is a structural diagram of scrambled data frames of a disc.
Figure 13:
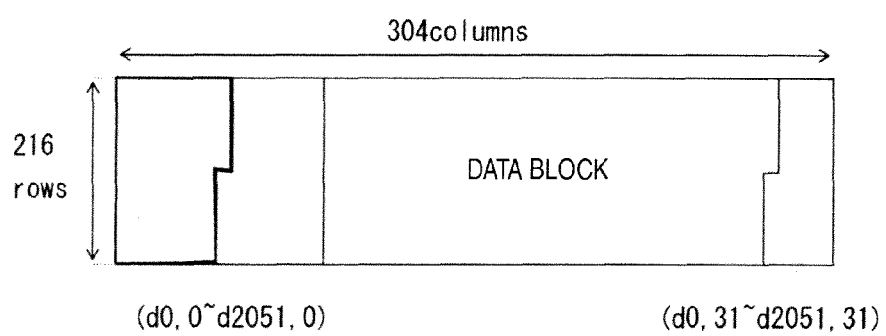
FIG. 13 is a structural diagram of data blocks with 216 rows and 304 columns of a disc.
Figure 14:
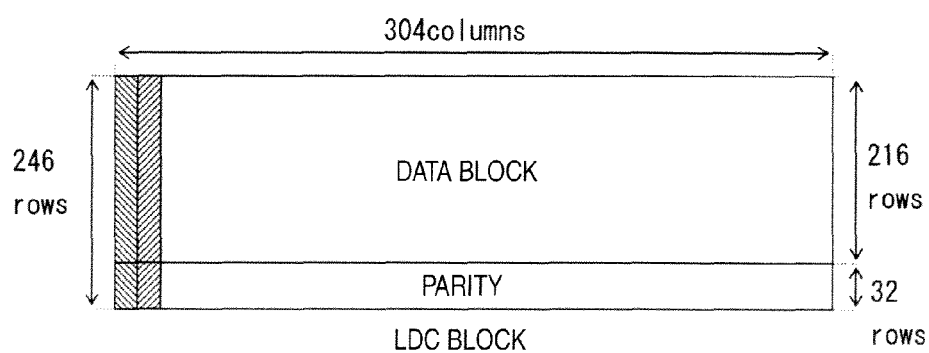
FIG. 14 is a structural diagram of LDC blocks of a disc.
Figure 15A:
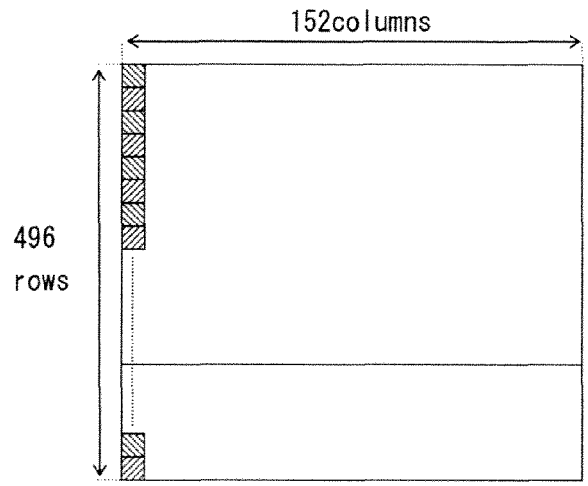
FIG. 15a is a structural diagram illustrating first interleaving with respect to LDC blocks.
Figure 15B:
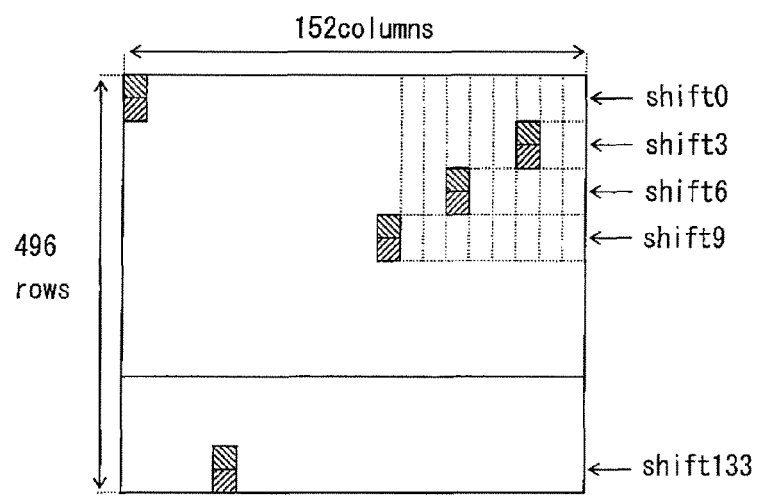
FIG. 15b is a structural diagram illustrating second interleaving with respect to LDC blocks.

Processing for recording user data is described. As shown in FIG. 11, user data is divided into parts each having 2048 bytes. An error detection code of 4 bytes is attached to each data element, thus constituting data frames of 2052 bytes. Then, as shown in FIG. 12, each data frame is scrambled, thus forming scrambled data frames. Then, as shown in FIG. 12, 32 scrambled data frames are collected. Then, they are rearranged on the column order. As shown in FIG. 13, data blocks in 216 rows and 304 columns are constituted. As shown in FIG. 14, each column of the data blocks is encoded by Reed-Solomon encoding of 248, 216, and 32. A parity of 32 bytes is added. New LDC (Long Distant Code) blocks in 248 rows and 304 columns are constituted. The LDC blocks are subjected to the following first interleaving process and second interleaving process. As shown in FIG. 15a, in the first interleaving process, data elements in the even-numbered columns and the following data elements in the odd-numbered columns are rearranged so as to be interleaved. Thus, blocks in 496 rows and 152 columns are constituted. In the second interleaving process, as shown in FIG. 15b, with respect to the rearranged blocks in 496 rows and 152 columns, rows are shifted from above, two rows at a time. The first 2 rows are not shifted. The next 2 rows are shifted to the left by three bytes. The next 2 rows are shifted by 6 bytes. The next 2 rows are shifted to the left by 9 bytes. In this way, a rearrangement is performed such that the amount of shift is increased by 3 bytes at a time. Data subjected to the first and second interleaving processes constitute LDC clusters.

On the other hand, addresses added to each such data block are generated as follows.

Figure 16:
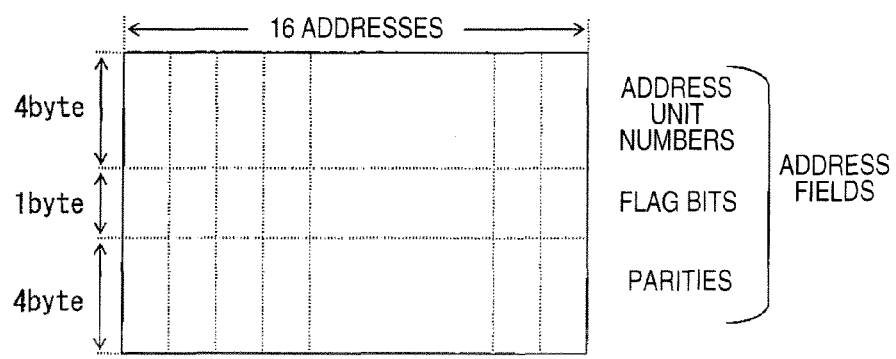
FIG. 16 is a structural diagram of address information on a disc.

As shown in FIG. 16, each data block is divided into 16 address units. 9 bytes of address information are assigned to each address unit. The 9 bytes consist of 4 bytes of address, 1 byte of flag information, 5 bytes of address, and a party attached to the flag information. The address is interleaved, and a matrix with 6 rows and 24 columns is generated. At the same time, 32 units of 18 bytes of user control data are arranged in a matrix with 24 rows and 24 columns.

Figure 17:
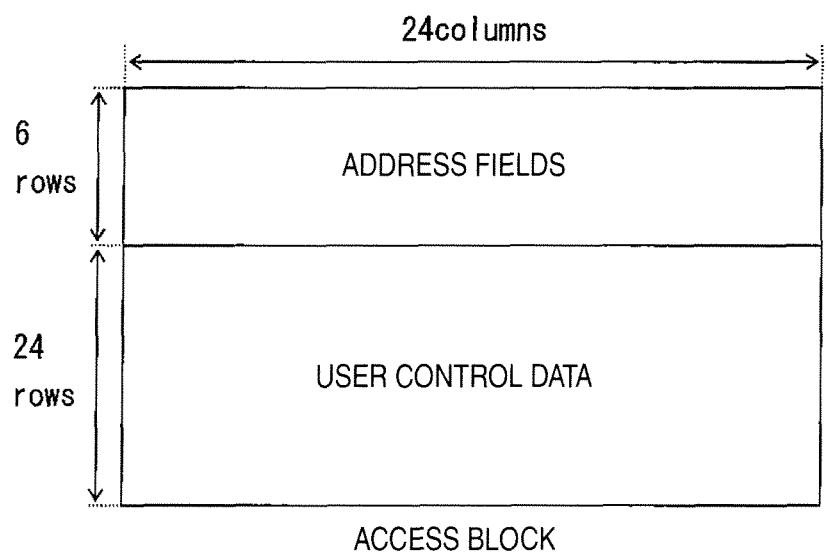
FIG. 17 is a structural diagram of access blocks of a disc.
Figure 18:
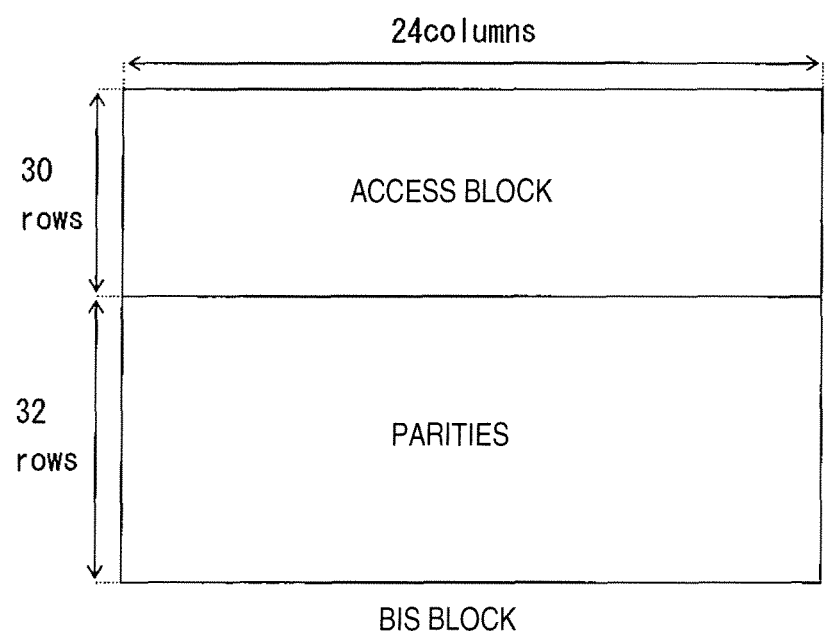
FIG. 18 is a structural diagram of BIS blocks of a disc.
Figure 19:
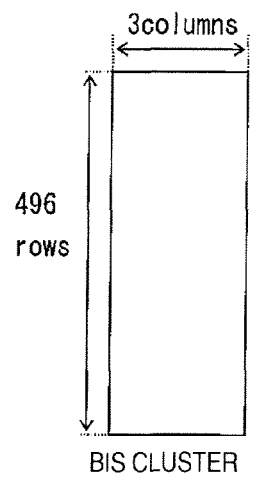
FIG. 19 is a structural diagram of BIS clusters of a disc.

The above-described matrix with 6 rows and 24 columns and the matrix with 24 rows and 24 columns are coupled together to constitute access blocks with 30 rows and 24 columns as shown in FIG. 17. The columns of the access blocks are encoded by Reed-Solomon encoding (62, 33, 32) and a parity of 32 bytes is attached to form BIS (Burst Indicating Subcode) blocks with 62 rows and 24 columns as shown in FIG. 18. Data in the BIS blocks are rearranged to constitute BIS clusters with 496 rows and 3 columns as shown in FIG. 19.

Figure 20:
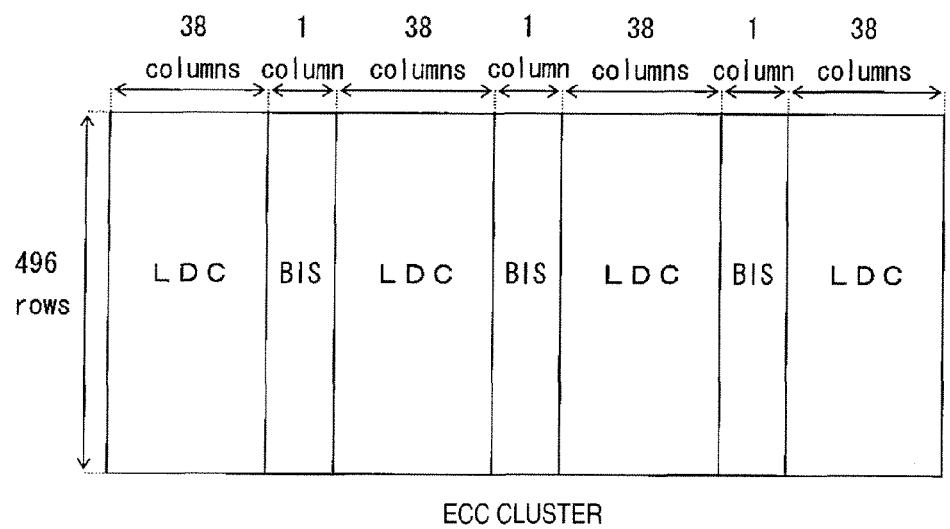
FIG. 20 is a diagram showing the structure of ECC clusters of a disc.
Figure 21:
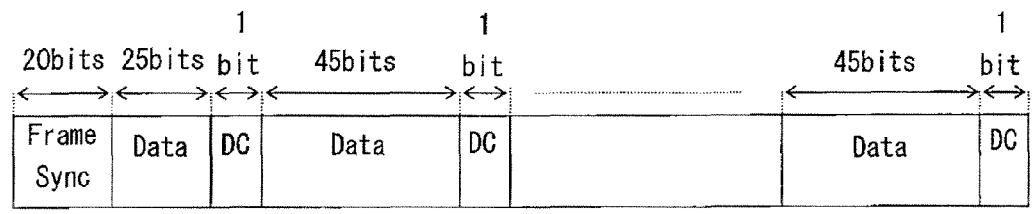
FIG. 21 is a diagram showing the structure of recording frames of a disc.

The LDC cluster is divided into ones each having 38 columns One column of BIS cluster of data is inserted between them. Thus, ECC clusters shown in FIG. 20 are constituted.

Twenty bits of frame sync signal are attached to the head of 155 bytes of data in each row of the ECC clusters. The 155 bytes of data are divided into leading 25 bits of data and following 45 bits of data. A DC control bit is interposed to constitute recording frames shown in FIG. 21. The DC control bit is so controlled that a modulated DSV approaches 0.

Modulation of the data in the recording frame induces 17 modulations according to the table shown in FIG. 22. A frame sync signal is attached using a sync code of 30 bits as shown in FIG. 23. In FIG. 23, if data occurring after a modulation preceding a sync code is terminated with 0000 or 00, # is 1; in other cases, # is 0.

[BCA]

FIG. 24 shows an arrangement of the BCA arrangement shown in FIG. 10, as viewed from above an optical disc 3100. A burst cutting area (BCA) 2402 is formed coaxially in a range from 21.3 mm radius to 22.0 mm of the optical disc 3100. Indicated by 2403 is a center hole. In this BCA, disc intrinsic information such as a disc ID or information about a format with which the disc is compliant is stored. This information occupies 4,648 channel bits of one revolution of about 4,750 channel bits.

A method of modulating data recorded in the burst cutting area 2402 is illustrated in FIG. 25. In the present modulation method, 2 bits of data are modulated into 7 bits of data. The modulated 7 bits of data is composed of a former half of 3 bits acting as a synchronization portion and a latter half of 4 bits acting as a data portion. The synchronization portion is composed only of "010". In the data portion, "1" is set in any one bit of the 4 bits. The other bits are set to "0". In FIG. 25, if the original data is "00", the data portion is modulated into "1000". Similarly, the original data "01", "10", and "11" are modulated into data portions "0100", "0010", and "0001", respectively.

FIG. 26 schematically shows the state in which the synchronization portion and the data portion are recorded in the burst cutting area 2402. In this case, data "0101000" is shown. In the case of bit "1", low-reflectivity portions are formed.

These are known as BCA marks. In the case of bit "0", these low-reflectivity portions are not formed. Variations in the disc reflectivity are almost zero.

The structure of data recorded in the burst cutting area 2402 is shown in FIG. 27. In FIG. 27, each row is composed of 5 bytes. The leading 1 byte of each row is a synchronization byte. The latter 4 bytes are data.

The first row is taken as a preamble. All are set to 00h.

Since the first synchronization byte is used in only the first row, the starting position of the BCA code can be detected by detecting the first synchronization byte. Alternatively, it can be detected along with 00h data following the first synchronization byte. From the 2 row to the 33rd row, the area is divided into parts each having 4 rows. From the second row to the fifth row, 16 bytes of data from user data I0,0 to I0,15 are arranged. Subsequently, from the sixth row to the ninth row, 16 bytes of parity C0,0 to C0,15 corresponding to the user data I0,0 to I0,15 from the second row to the fifth row are arranged. The user data from the second row to the fifth row and the parity bits from the sixth row to the ninth row together constitute one ECC block.

Similarly, the user data I1,0 to I1,15 are arranged from the 10th row to the 13th row. C1,0 to C1,15 are arranged from parity bits corresponding to the 14th row to the 17th row. User data I2,0 to I2,15 are arranged from the 18th row to the 21st row. Parity bits C2,0 to C2,15 corresponding to the 22nd row to the 25th row are arranged. User data I3,0 to I3,15 are arranged from the 26th row to the 29th row. Parity bits C3,0 to C3,15 corresponding to the 30th row to the 33rd row are arranged.

The sync bytes from the second row to the fifth row are set to SB00. The sync bytes from the sixth row to the ninth row are set to SB01. The sync bytes from the tenth row to the thirteenth row are set to SB02. The sync bytes from the 14th row to the 17th row are set to SB03. The sync bytes from the 18th row to the 21st row are set to SB10. The sync bytes from the 22nd row to the 25th row are set to SB 11. The sync bytes from the 26th row to the 29th row are set to SB12. The sync bytes from the 30th row to the 33rd row are set to SB13. No data is arranged in the 34th row but only SB32 of sync byte is arranged. Data of FIG. 27 indicate data prior to modulation according to the modulation method of FIG. 25. The data amount is 166 bytes (=5 bytes×4 rows×8 sets+5 bytes+1 byte). As a result of modulation of the information, 4648 channel bits (=166×8×7/2) are obtained.

Figures 28, 29, 30:
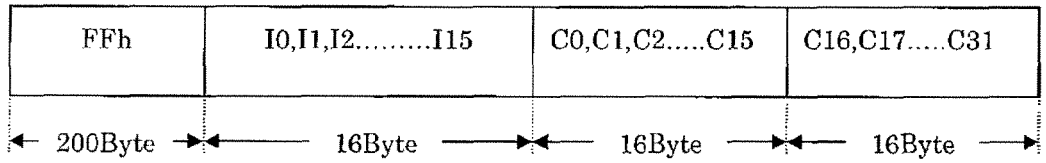
FIG. 28 is a table of a pattern of sync signals of BCA.
FIG. 29 is a structural diagram of ECC blocks in a BCA code.
FIG. 30 is a structural diagram of data blocks of BCA.

A specific data sequence of the sync signal of FIG. 27 is shown in FIG. 28. In the example of FIG. 28, data is expressed as a modulated channel bit sequence. 28 channel bits of sync byte is composed of 14 channel bits of sink body and 14 channel bits of sink ID. 14 channel bits of sink body are composed of 7 channel bits of sink body 1 and 7 channel bits of sink body 2. 14 channel bits of sink ID are composed of 7 channel bits of sink ID1 and 7 channel bits of sink ID2.

The sink bodies are in a pattern not complying with the already described intrinsic modulation rule. That is, if the present modulation rule were followed as set forth in FIG. 25, the synchronization portion should be "010". However, the synchronization portion of the sink body 2 is different from "010" but set to "001". Therefore, the sync bytes can be identified from data.

The sink bodies 1 of sync bytes are all set to "010 0001". The sink bodies 2 are set to "001 0100". In contrast, the sink IDs have different values for different sync bytes. Consequently, the sync bytes can be identified. Since the sync bytes are different from each other in this way, they can be identified.

The configuration of an ECC block of a BCA code is shown in FIG. 29. Reed-Solomon codes of RS (248, 216, and 33) are used for the ECC. These are Reed-Solomon codes similar to the ECC blocks of FIG. 14. However, in the case of the ECC block of BCA code, the leading 200 bytes are fixed data, and FFh, for example, is used as shown in FIG. 29. 16 bytes of data following the fixed data are used as substantial BCA user data. A parity of 36 bytes is computed using the 200 bytes of fixed data and 16 bytes of BCA data.

Leading 200 bytes of data out of 216 bytes of data in the present invention are fixed data and not recorded on an optical disc. Similarly, only parity bits C0 to C15 of the leading 16 bytes out of 32 bytes of parity are recorded on the optical disc 1. The remaining 16 bytes of parity are not recorded. During decoding, the same value is used as it is as the 200 bytes of fixed data. Furthermore, the 16 bytes of parity not recorded are decoded as lost flags. That is, out of 32 bytes of parity, the latter 16 bytes are treated as parity bytes which have been lost from their positions. Even if a half of the parity data is lost, their positions are known and so the original parity data can be decoded.

In this way, by using the same RS (248, 216, 33) as the ECC of user data recorded in the user data area, quite powerful error correcting capabilities can be accomplished with BCA. Furthermore, the same hardware configuration can be used and so the circuit scale can be reduced. A cost reduction can be accomplished. Furthermore, it suffices to be able to record only 32 bytes. The data capacity can be increased compared with the case where all 248 bytes are recorded.

The configuration of a data block in the BCA is shown in FIG. 30. In the present invention, four ECC blocks are recorded in a burst cutting area 2402. The 16 bytes of data in each ECC block is composed of leading 1 byte of content code and the following 15 bytes of content data. In the content code in the BCA, 6 bits from the first bit 7 to bit 2 are used as an application ID. The last two bits consisting of bit 1 and bit 0 are used as a sequence number.

The optical disc recording/reproducing device can record or reproduce data only on optical discs having predetermined application IDs. For example, the device can record key information for encryption/decryption of contents which is necessary to protect contents data on discs having certain application IDs.

The sequence number is composed of two bits and is any one of "00", "01", "10", and "11". When the contents data of each ECC block are 14 bytes or less, their sequence numbers are set to "00".

A method of storing contents data is shown next. For example, where the same contents data are stored as contents data sets for two leading ECC blocks out of four ECC blocks (in this case, the same contents data of the same application ID are written doubly), the sequence numbers of the ECC blocks are set to "00". That is, where the same contents data are recorded, the sequence numbers of two ECC blocks are set to the same number.

When 24 bytes of contents data different from the application ID of the first ECC blocks are subsequently recorded in the remaining two ECC blocks, the sequence number of the first one is set to "00" and the sequence number of the second ECC block is set to "01". That is, where sequence numbers are used over plural ECC blocks, serial numbers are stored.

Since an application ID and a sequence number are recorded in each ECC block in this way, it is possible to judge from them in what ECC block are desired data stored or whether multiple writing is done.

The BCA contents code and contents data of the data block of FIG. 30 correspond to I0,0 to I0,15 of the leading ECC block of FIG. 27.

Since the BCA is divided into four ECC blocks, recorded various types of data are classified according to purpose of use. Contents data are arranged so as to be located within the same ECC block and recorded on a disc. For example, contents data which facilitate identification of disc types and are useful for rapidity of setup and information about disc type, recording characteristics, version number of a standard with which the disc is compliant, type information, surface information, and the number of recording layers are stored and recorded in the same ECC block. Contents data used for copy management, manufacturer identification code, and unique number are stored and recorded in another ECC block. Unnecessary ECC computations and undesired transfer of contents data through the memory space can be prevented by recording contents data in separate blocks according to application in this way. The load on the recording/reproducing device can be reduced.

[Disc Recording/Reproducing Device]

Figure 31:
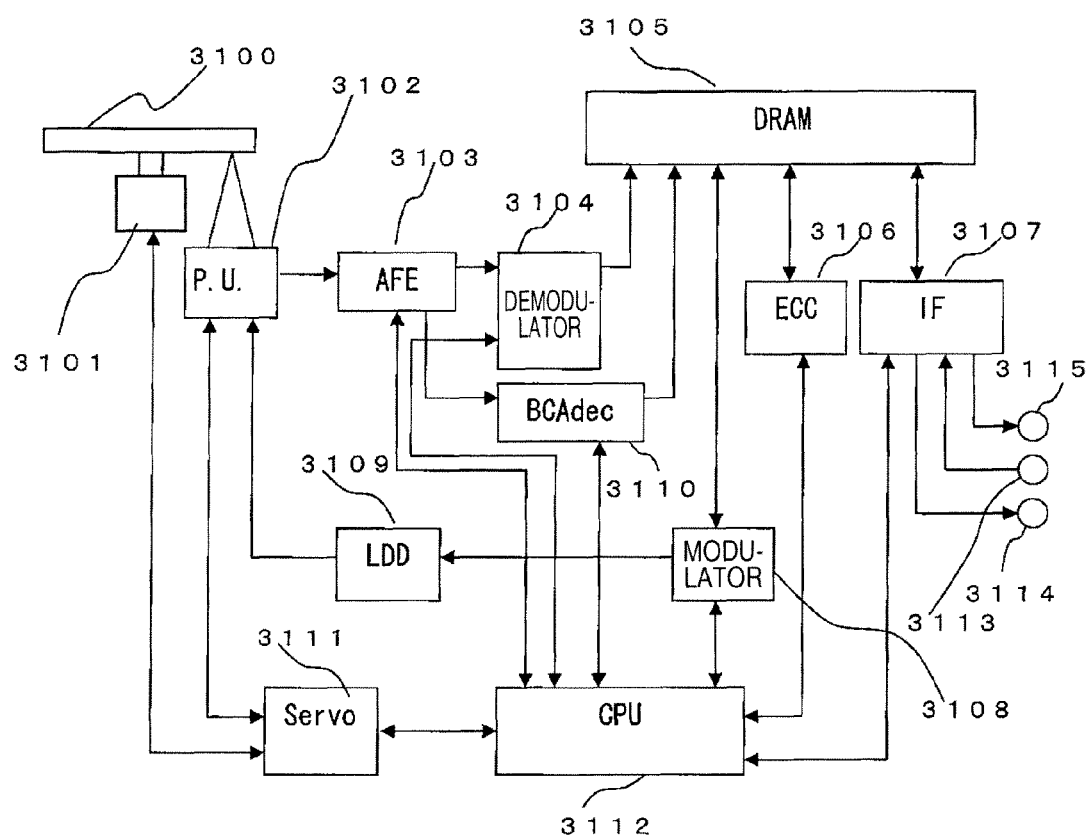
FIG. 31 is a block diagram of an optical disc recording/reproducing device.

A recording/reproducing device for recording and reproducing the optical disc for which shape, data encoding, and BCA have been described as preferable for the present invention is described by referring to FIG. 31. FIG. 31 is a block diagram of the recording/reproducing device. In FIG. 31, indicated by 3100 is a recordable optical disc shown in FIGS. 2, 3, 8, and 9. A disc motor 3101 rotates the disc 3100. An optical pickup 3102 irradiates laser light on the disc 3100, detects reflected light, and obtains a reproduction signal. Also, the 3102 irradiates laser light having a waveform precisely shaped during recording on the disc 3100 and makes a recording. An analog front end 3103 shapes the waveform of the signal detected by the optical pickup 3102, generates a servo signal, and performs other processing. A demodulation processing circuit 3104 binarizes the wave shaped signal and performs decoding based on the 1-7 modulation described in encoding processing of data. Indicated by 3105 is a DRAM (Dynamic Randum Access Memory) used to temporarily store decoded data, data being corrected, input and output data, unmodulated data, and so on. Indicated by 3106 is an ECC (Error Correction Circuit) that provides error correction of already decoded data temporarily stored in the DRAM 3105 during reproduction processing. During recording processing, the ECC adds error correcting codes to the input data temporarily stored in the DRAM 3105. Indicated by 3107 is an interface circuit that causes the data temporarily stored in the DRAM 105 to be output from an output terminal 3114, stores the input data from an input terminal 3113 in the DRAM 3105, causes the BCA related information stored in the DRAM 3105 to be output from an output terminal 3115, and implements other interface processing. Note that 3113 and 3115 can be made common. Furthermore, 3113, 3114, and 3115 can be made common by using bidirectionality. A modulator circuit 3108 modulates data read from the DRAM 3105 based on the 1-7 modulation described in the encoding processing of data during recording, and supplies the modulated data to an LDD (Laser Diode Driver) 3109. During recording, the LDD 3109 supplies a recording waveform appropriate for recording of the modulated data to the optical pickup 3102. The optical pickup 3102 emits according to the recording waveform and makes a recording. A BCA decoder 3110 performs decoding of the BCA data blocks recorded according to the presence and absence of low reflectivity as described in [BCA] during the reproduction of the BCA.

When the power supply is turned on or the optical disc 3100 is inserted, the recording/reproducing device executes setup processing included in recording instructions and reproduction instructions from a host controller. First, laser light is irradiated on the disc 3100. The reflectivity of the disc or the distance between the cover layer and the recording layer is obtained by making use of light returning from the disc 3100. The type of the disc is identified roughly. Then, the disc 3100 is rotated counterclockwise using the disc motor 3101 to move the optical pickup 3102 from a radial position of 21.3 mm to 22.0 mm in the BCA. Then, based on the results regarding the type, parameters regarding the laser power and focus servo are initialized. BCA data are reproduced while performing focus servo control. The type of the disc, compatibility, playability, or recordability is determined from the disc type contained in the reproduced BCA data, recording characteristics (such as ROM, recordable, or rewritable), the presence or absence of recordability and playability, type information indicating whether the disc is single-sided or double-sided, surface information indicating whether the surface is A or B, the number of recording layers, the direction in which the data area is recorded and reproduced, and the presence or absence of a disc cartridge. Various kinds of disc management information recorded in the Inner Zones 1002, 1014 and Outer Zones 1004, 1016 are read out, and preparations are made for recording instructions and reproduction instructions from a host controller. When the optical disc detected by the recording/reproducing device has no cartridge in spite of the fact that disc cartridge information read from the BCA indicates that there is a cartridge, there is the possibility that hands grease, smudges, or the like adheres to the recording surface or the recording surface is scratched and thus the recording quality is not assured sufficiently. Hence, the disc can be used as a disc having only reading compatibility.

In a system for managing file management information about file data recorded in the Data Zones 1003 and 1015 of the disc by means of the HDD within the host controller, the host controller attempts to achieve consistency between the disc and the file management information using disc ID (manufacturer identification code) read from the recording/reproducing device, identification number (individual identification number), and surface information. When the recording/reproducing device can read file data from both surfaces without involving ejection or reinsertion of the optical disc, it is easy to generate and manage file management information that takes the single disc as one logical volume, from type information, surface information, and layer information on both surfaces, irrespective of whether the disc is single-sided or double-sided.

Figure 32:
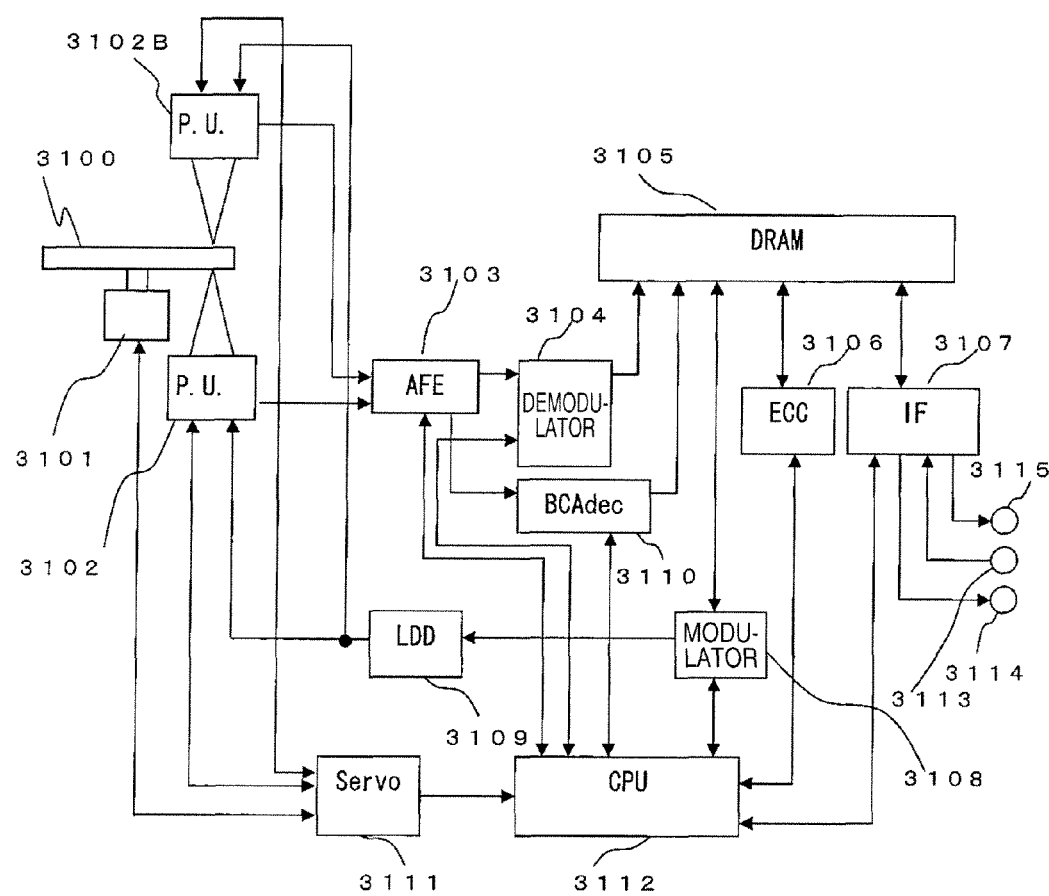
FIG. 32 is a block diagram of an optical disc recording/reproducing device permitting access to both surfaces.
Figure 33:
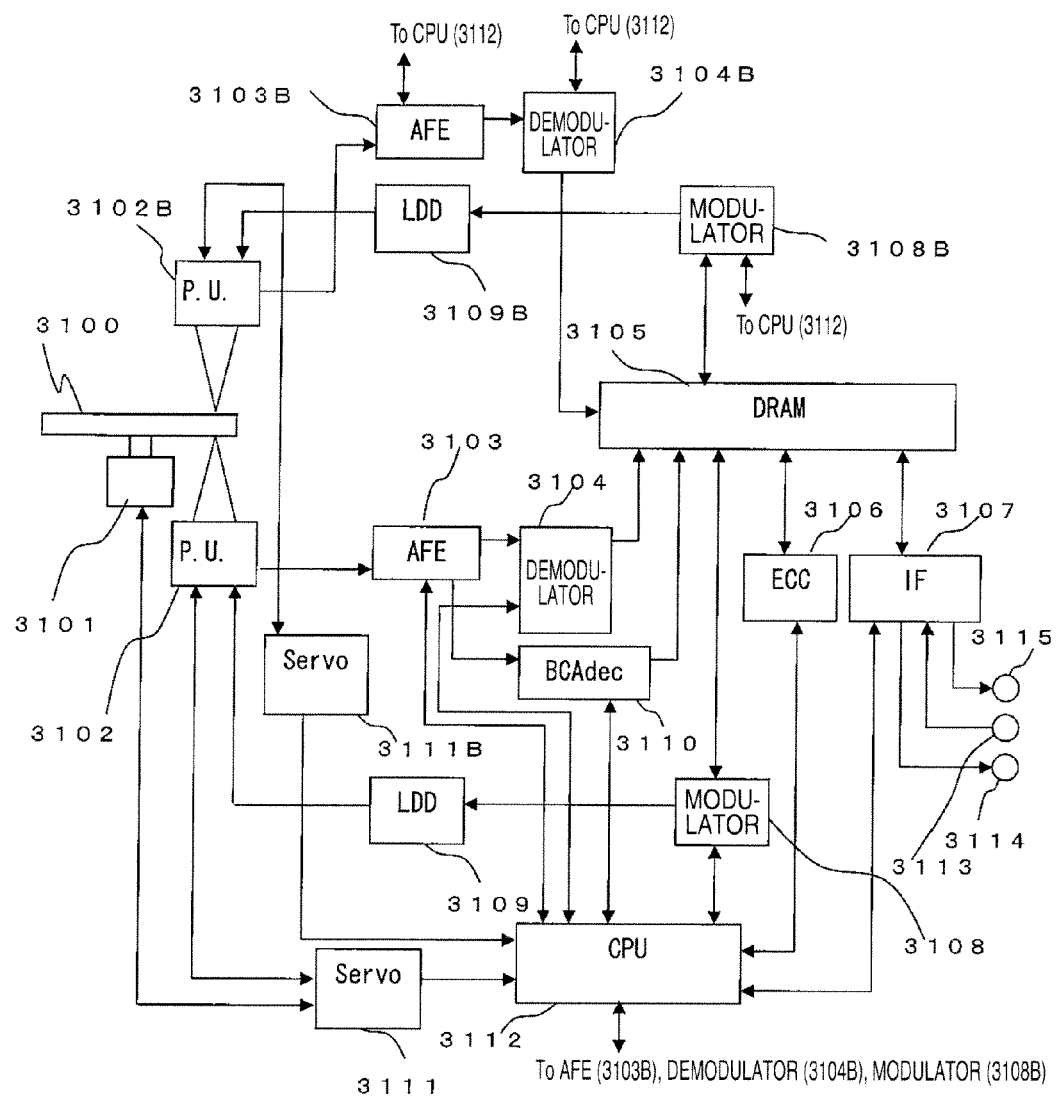
FIG. 33 is a block diagram of an optical disc recording/reproducing device permitting simultaneous access to both surfaces.
Figure 36:
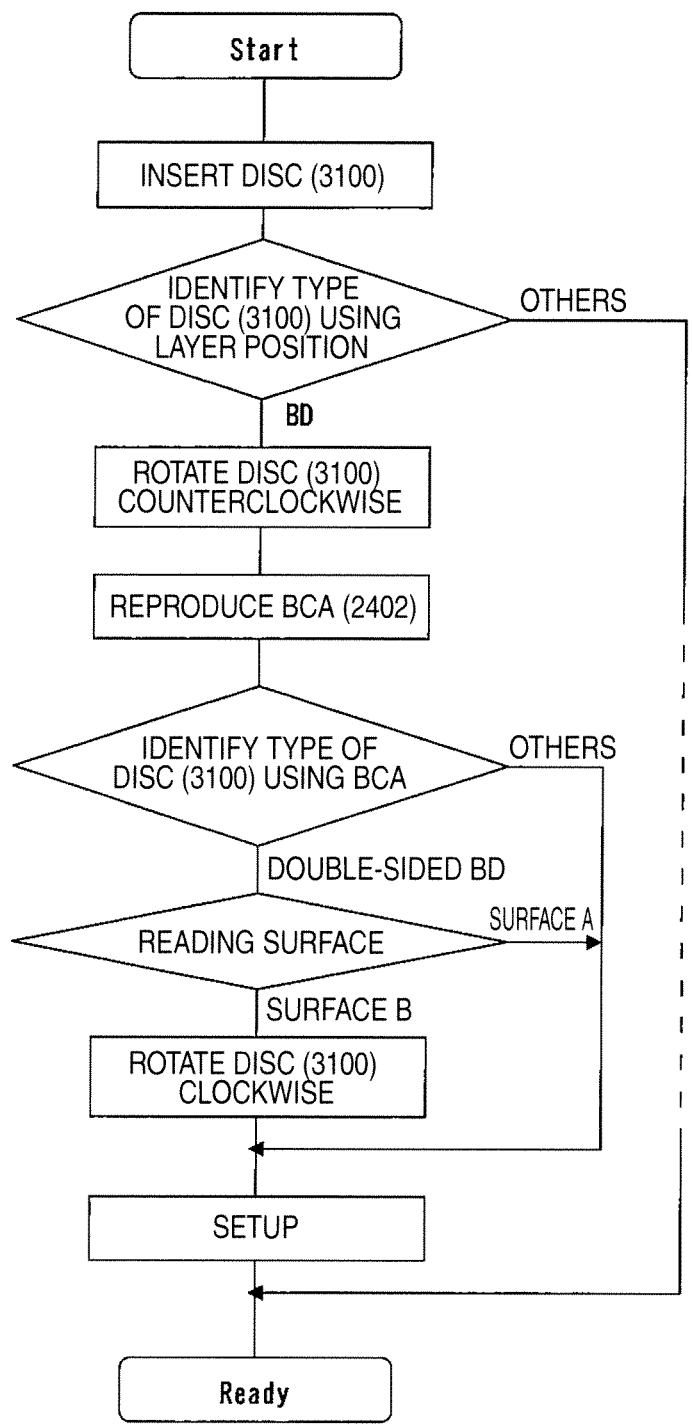
FIG. 36 is a flowchart of setup processing when a disc is inserted.

Then, an optical disc and recording/reproducing device therefor that is a second embodiment of the present application is described based on the first embodiment and by referring to FIGS. 32, 33, and 36.

Embodiment 2 is an embodiment in a case where surface A has the same recording layer structure as the Blu-ray Disc (Trademark) and surface B has a lead-in area, a data zone, and a lead-out area. Data are recorded to and reproduced from these lead-in area, data zone, and lead-out area in the direction opposite to the surface A, i.e., counterclockwise. The BCA is reproduced in the same direction as when the surface A is read, i.e., counterclockwise.

FIG. 32 is a recording/reproducing device for recording and reproducing data on a double-sided disc. The device has optical pickups 3102 and 3102B for recording and reproduction over both surfaces. The device records and reproduces data on both surfaces of the disc without ejection or reinsertion of the disc. A servo circuit 3111 for spindle, focus, and tracking controls the two optical pickups 3102 and 3102B while switching them. Input signals from the two optical pickups are switched by an analog front end 3103 at its entrance. The disc motor 3101 can rotate the disc 3100 either counterclockwise or clockwise. In other respects, this recording/reproducing device is the same as the recording/reproducing device of FIG. 31.

FIG. 33 is a recording/reproducing device having optical pickups 3102 and 3102B for recording and reading over both surfaces and operating to record and reproduce data at the same time on both surfaces of a double-sided disc without ejection or reinsertion of the disc. All are doubled except for the disc motor 3101, BCA decoder 3110, CPU 3112, DRAM 3105, ECC 3106, and IF 3107. The device is so configured that it can record and reproduce data on both surfaces of the disc 3100 independently. The CPU controls recording and reproduction on the surfaces A and B at the same time. The disc motor 3101 can rotate the disc 3100 either counterclockwise or clockwise. In other respects, this device is the same as the recording/reproducing device of FIG. 31. In the present recording/reproducing device, BCA data from the disc 3100 are read out from one side.

FIG. 36 illustrates setup processing included in recording instructions and reproduction instructions from a host controller when the optical disc 3100 is inserted into the recording/reproducing device of FIGS. 32 and 33. It is here assumed in the present both-sided disc that both surfaces of blu-ray Discs (Trademark) are bonded together except that the spiral direction on surface B is reverse. First, laser light from the optical pickup 3102 is irradiated on the disc 3100. Laser light from the optical pickup 3102B is not irradiated. The reflectivity of the recording surface located on the lower side or the distance between the cover layer and the recording layer is obtained by making use of light returning from the disc 3100, and the disc type is identified roughly. When the present disc 3100 is a Blu-ray Disc (Trademark), the disc 3100 is rotated counterclockwise using the disc motor 3101 to move the optical pickup 3102 from a radial position of 21.3 mm to 22.0 mm in the BCA. Then, parameters regarding the laser power and focus servo for the Blu-ray Disc (Trademark) are initialized. Data from the BCA are reproduced while performing focus servo control. The type of the disc, compatibility, playability, or recordability are determined from the disc type contained in the reproduced BCA data, recording characteristics (such as ROM, recordable, or rewritable), the presence or absence of recordability and/or playability, type information indicating whether the disc is single-sided or double-sided, surface information indicating whether the surface is A or B, the number of recording layers, the direction in which the data area is recorded and reproduced, and the presence or absence of a disc cartridge. When the surface information indicates that the recording surface located on the lower side is surface B, rotation of the disc 3100 is reversed from counterclockwise to clockwise, and various types of disc management information recorded in the Inner Zones 1002, 1014 and Outer Zones 1004, 1016 are read out. Preparations are made for recording instructions and reproduction instructions from the host controller.

When the double-sided optical disc of embodiment 1 exists in addition to the double-sided optical disc of Embodiment 2, in the recording/reproducing device of FIG. 32, the direction of the rotation of the disc caused by the disc motor 3101 is controlled using information about the data recording and reproduction direction in the lead-in, data zone, and lead-out area excluding the BCA area of Byte 3. In particular, BCA data are reproduced. Disc type, compatibility, and playability or recordability are determined from information about the type of the disc contained in the BCA data, the recording characteristics (such as ROM, Recordable, or Rewritable), the presence or absence of recordability and/or playability, type information indicating whether the disc is single-sided or double-sided, surface information indicating whether the surface is A or B, the number of recording layers, the direction in which the data area is recorded and reproduced, and the presence or absence of a disc cartridge. When the direction in which the data area is recorded and reproduced is clockwise, the rotation of the disc 3100 is reversed from counterclockwise to clockwise. Various kinds of disc management information recorded in the Inner Zones 1002, 1014 and in the Outer Zones 1004 and 1016 are read out, and preparations are made for recording instructions and reproduction instructions from the host controller.

An optical disc and recording/reproducing device therefor that is a third embodiment of the present application is next described based on the first and second embodiments.

Embodiment 3 is an embodiment in a case where surface A has the same recording layer structure as the Blu-ray Disc (Trademark) but surface B has lead-in, data zone, and lead-out area of data which are recorded and reproduced in the reverse direction to the surface A, i.e., clockwise, and where the BCA reading direction is reverse to the surface A, i.e., clockwise.

When the present optical disc is played by the recording/reproducing device of FIG. 32 or FIG. 33, the direction in which the BCA is read needs to be detected during reading of the BCA data when setup processing is performed. In the present embodiment, the spindle motor 3101 is rotated in the default direction of rotation of the recording/reproducing device (counterclockwise in this example), and laser light from the optical pickup 3102 is irradiated. The BCA is reproduced. As a result, if the BCA cannot be detected or cannot be decoded correctly, it is determined that there are errors due to failure of detection of the modulation pattern of majority bit data, for example, of FIG. 25, that there are errors in LDC coding correction of the BCA data based on FIG. 29, and that the direction in which the BCA is reproduced is reverse. The laser light from the optical pickup 3102B is irradiated, and the rotation of the spindle motor 3101 is reversed to clockwise. The BCA data are again reproduced. The BCA data are reproduced. The disc type, compatibility, playability, or recordability are determined from the information contained in the read BCA data, i.e., information about the disc type, recording characteristics (such as ROM, Recordable, or Rewritable), the presence or absence of recordability and/or playability, type information indicating whether the disc is single-sided or double-sided, surface information indicating whether the surface is A or B, the number of recording layers, the direction in which the data area is recorded and reproduced, and the presence or absence of a disc cartridge. Various types of disc management information recorded in the Inner Zones 1002, 1014 and in the Outer Zones 1004, 1016 are read out. Preparations are made for recording instructions and reproduction instructions from the host controller.

Figure 7:
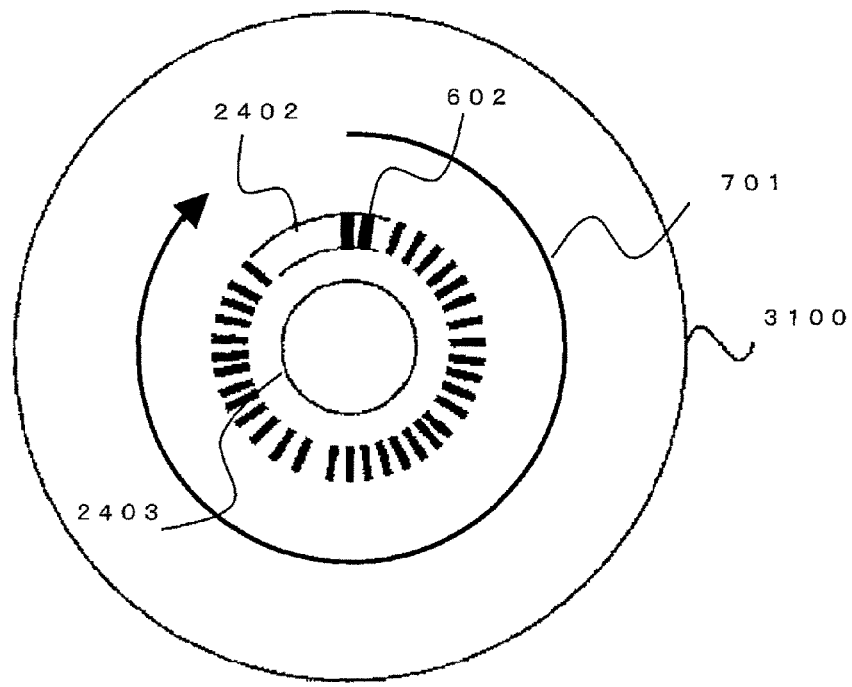
FIG. 7 is a structural diagram showing a clockwise spiral direction in a disc.

An optical disc and recording/reproducing device therefor being a fourth embodiment of the present application is next described by referring to FIGS. 6 and 7, based on the first through third embodiments.

Embodiment 4 is an embodiment in a case where surface A has the same recording layer structure as the Blu-ray Disc (Trademark) in the same way as in embodiment 3 but surface B has lead-in area, data zone, and lead-out which are recorded and reproduced in the direction reverse to surface A, i.e., clockwise and where the BCA reproduction direction is reverse to surface A, i.e., clockwise.

FIGS. 6 and 7 show the shape of the marks of the BCA in the present embodiment. Indicated by 602 is a marker indicative of the direction in which the BCA is reproduced. 601 indicates that the present recording surface is reproduced counterclockwise. 701 indicates that the present recording surface is reproduced clockwise. The present marker is composed of a plurality of BCA marks. Each mark has a width that is double the normal BCA marks shown in FIG. 26, and is placed at the head of the array of other BCA data. When the present optical disc is reproduced by the recording/reproducing device of FIG. 32 or FIG. 33, the present marker is used for detection of the direction in which the BCA is reproduced during reading of the BCA data when setup processing is performed. In the present embodiment, the spindle motor 3101 is rotated in the default direction of rotation of the recording/reproducing device (counterclockwise in this example). The laser light from the optical pickup 3102 is irradiated, and the BCA is reproduced. When the marker indicating the direction in which the BCA is reproduced cannot be detected at the head of the array of the other BCA data, it is judged that the BCA reproduction direction is reverse. The laser light from the optical pickup 3102B is irradiated. Rotation of the spindle motor 3101 is reversed to clockwise. The BCA data are again reproduced. The data in the BCA are reproduced. The disc type, compatibility, playability, or recordability are determined from the information contained in the reproduced BCA data, i.e., disc type, recording characteristics (such as ROM, Recordable, or Rewritable), the presence or absence of recordability and/or playability, type information indicating whether the disc is single-sided or double-sided, surface information indicating whether the surface is A or B, the number of recording layers, the direction in which the data area is recorded and reproduced, and the presence or absence of a disc cartridge. Various types of disc management information recorded in the Inner Zones 1002, 1014 and in the Outer Zones 1004, 1016 are read out. Preparations are made for recording instructions and reproduction instructions from the host controller.

REFERENCE SIGNS LIST

3100: optical disc; 3101: disc motor; 3102: optical pickup; 3103: analog front end; 3104: demodulation circuit; 3105: DRAM; 3106: ECC; 3107: interface circuit; 3108: modulator circuit; 3109: LDD; 3110: BCA decoder; 311: servo circuit; 3112: CPU

The invention claimed is:

1. An optical disc having recording surfaces on its both surfaces, comprising:
   a burst cutting area (BCA) in which information about the optical disc is recorded; and
   a lead-in area which is located on a peripheral side of the BCA and in which information about the optical disc is recorded;
   wherein the BCA is divided into a plurality of blocks;
   wherein a first one of the plurality of blocks has information recorded therein, the information indicating at least disc type, recording characteristics, a version number of a standard with which the disc is compliant, and whether the disc is double-sided or not;
   wherein a second one of the plurality of blocks has at least optical disc intrinsic information used for copy management and a manufacturer identification code recorded therein; and
   wherein in the lead-in area, the disc type, recording characteristics, and a version number of the standard with which the disc is compliant are recorded in the lead-in area, but the information indicating whether the disc is double-sided or not is not recorded in the lead-in area.

2. The optical disc set forth in claim 1, wherein the first block contains information for identifying the recording surfaces.

3. The optical disc set forth in claim 2, wherein the first block contains information for identifying a direction in which the disc is rotated to reproduce data zones on the recording surfaces.

4. The optical disc set forth in claim 1, wherein the first block contains information indicating the presence or absence of a disc cartridge.

5. The optical disc set forth in claim 1, wherein the BCA is recorded on both surfaces.

6. The optical disc set forth in claim 1, wherein information indicating whether or not the disc is a double-sided disc is also recorded in the lead-in area.

7. A method of recording information on an optical disc, the optical disc having recording surfaces on its both surfaces, the optical disc having a burst cutting area (BCA) in which information about the optical disc is recorded and a lead-in area located on a peripheral side of the BCA and having information about the optical disc recorded therein, the BCA being divided into a plurality of blocks, the method comprising the steps of:
   recording information indicating at least disc type, recording characteristics, a version number of a standard with which the disc is compliant, and whether the disc is double-sided in a first one of the plurality of blocks;
   recording at least optical disc intrinsic information used for copy management and a manufacturer identification code in a second one of the plurality of blocks; and
   recording the disc type, recording characteristics, and a version number of the standard with which the disc is compliant in the lead-in area, without recording the information indicating whether the disc is double-sided or not in the lead-in area.

8. A method of reproducing information from an optical disc, the optical disc having recording surfaces on its both surfaces, the optical disc having a burst cutting area (BCA) in which information about the optical disc is recorded and a lead-in area located on a peripheral side of the BCA and having information about the optical disc recorded therein, the BCA being divided into a plurality of blocks;
   wherein information indicating at least disc type, recording characteristics, a version number of a standard with which the disc is compliant, and whether the disc is double-sided is recorded in a first one of the plurality of blocks;
   wherein at least optical disc intrinsic information used for copy management and a manufacturer identification code are recorded in a second one of the plurality of blocks;
   wherein in the lead-in area, the disc type, recording characteristics, and a version number of the standard with which the disc is compliant are recorded in the lead-in area, but the information indicating whether the disc is double-sided or not is not recorded in the lead-in area; and
   wherein information is reproduced from the BCA and lead-in area of the optical disc.

9. An optical disc having entrance surfaces for an optical beam on both sides of the optical disc, comprising:
   a burst cutting area (BCA) in which information about the optical disc is recorded; and a lead-in area on a side A and a side B opposed to the side A the lead-in area being located on a peripheral side of the BCA and in which information about the optical disc is recorded, wherein the BCA has information recorded therein, the information indicating at least disc type, recording characteristics, a version number of a standard with which the disc is compliant, and whether the disc is double-sided or not, wherein the lead-in area has the information recorded therein, the information indicating at least disc type, recording characteristics, a version number of a standard with which the disc is compliant, wherein a direction of rotation for reading out the BCA of the side A and the side B is the same as a direction of rotation for reading out the lead-in area of the side A, and wherein a direction of rotation for reading out the lead-in area of the side B is reverse to the direction of rotation for reading out the lead-in area of the side A.

* * * * *